United States Patent [19]

Schlauer et al.

[11] 4,297,330
[45] Oct. 27, 1981

[54] PROCESS OF SELECTIVELY DESULFURIZING GASES

[75] Inventors: Johann Schlauer, Frankfurt am Main; Georg Kempf, Schöneck; Alexander Doerges, Frankfurt am Main, all of Fed. Rep. of Germany

[73] Assignee: Metallgesellschaft AG, Frankfurt am Main, Fed. Rep. of Germany

[21] Appl. No.: 134,360

[22] Filed: Mar. 27, 1980

[30] Foreign Application Priority Data

Mar. 27, 1979 [DE] Fed. Rep. of Germany ....... 2912115

[51] Int. Cl.³ ............................................. B01D 53/34
[52] U.S. Cl. ..................................... 423/232; 423/233
[58] Field of Search ............... 423/223, 232, 233, 226, 423/573 G, 573 R

[56] References Cited

U.S. PATENT DOCUMENTS

| | | | |
|---|---|---|---|
| 1,440,977 | 1/1923 | Espenhan | 423/232 |
| 1,598,985 | 9/1926 | Petit | 423/233 |
| 1,918,153 | 7/1933 | Wagner | 423/233 |
| 2,094,070 | 9/1937 | Huttman et al. | 423/232 |

FOREIGN PATENT DOCUMENTS

| | | | |
|---|---|---|---|
| 2659015 | 7/1978 | Fed. Rep. of Germany | 423/233 |
| 314860 | 1/1930 | United Kingdom | 423/233 |
| 948270 | 1/1964 | United Kingdom | 423/226 |

*Primary Examiner*—Earl C. Thomas
*Attorney, Agent, or Firm*—Sprung, Felfe, Horn, Lynch & Kramer

[57] ABSTRACT

In a process of selectively desulfurizing gases which contain hydrogen sulfide and carbon dioxide comprising scrubbing the gases with an aqueous potassium carbonate solution under superatmospheric pressure and at temperatures of about 100° C., regenerating the laden scrubbing solution and recycling the regenerated scrubbing solution, the improvement wherein the gases to be purified are scrubbed with an aqueous potassium carbonate solution so as to maintain a mass ratio of 1.0 to 3.0 vals (gram equivalents) of alkali in the solution per mole of $CO_2$ and $H_2S$ in the gases to be purified, the laden scrubbing liquor is subsequently regenerated by being stripped with a gas in which a $CO_2$ partial pressure above 0.2 bar is maintained, and the so regenerated scrubbing solution is recycled.

7 Claims, 2 Drawing Figures

PROCESS OF SELECTIVELY DESULFURIZING GASES

BACKGROUND OF THE INVENTION

FIELD OF THE INVENTION

This invention relates to a process of selectively desulfurizing gases which contain hydrogen sulfide and carbon dioxide comprising scrubbing the gases with an aqueous potassium carbonate solution under superatmospheric pressure and at temperatures of about 100° C., regenerating the laden scrubbing solution and recycling the regenerated scrubbing solution.

DISCUSSION OF THE PRIOR ART

In a known process of desulfurizing carbon dioxide-containing gases which have been produced by a reaction of liquid or solid carbonaceous fuels with free oxygen-containing gases and steam under superatmospheric pressure, the sulfur compounds are removed in that the gases are scrubbed with an aqueous potassium carbonate solution in a plate column or packed column and the laden solution is regenerated by being pressure-relieved, heated, and stripped with steam. That process is characterized in that the gases are scrubbed with a concentrated aqueous potassium carbonate solution at a temperature near the atmospheric boiling point of the solution and while a ratio of 0.20 to 2.0 m$^3$ of solution per standard m$^3$ of hydrogen sulfide in the gases to be purified is maintained. In this way the hydrogen sulfide is selectively removed. The potassium carbonate solution used for scrubbing may contain alkali salts of boric acid or of phosphoric acid (German Pat. No. 2,127,768). That process can be carried out with a high selectivity in a wide range but has the disadvantage that the residual H$_2$S content is not always minimal. Another disadvantage resides in that steam is required at a high rate to regenerate the solution, particularly if the gases are to be desulfurized as far as possible.

Alkali metal carbonate solutions which contain hydrogen sulfide and hydrogen carbonate and have been obtained by the desulfurization of CO$_2$-containing hot gases by adsorption under superatmospheric pressure can be regenerated in another known process, in which the solutions are pressure-relieved and stripped, the content of alkali metal hydrogen carbonate in the pressure-relieved solution is adjusted before the stripping step to at least 55% of the total alkali content and the solution is then stripped at boiling temperature to remove H$_2$S and part of the CO$_2$ and is subsequently recycled without cooling to the gas-desulfurizing unit (Offenlegungsschrift No. 2,659,015).

That process is advantageous when as much hydrogen sulfide and as little CO$_2$ as possible is to be removed from the gas by scrubbing. This is desired in various cases, e.g., in the desulfurization of fuel gas for use in a gas turbine process, when the mass of the wet gas is to be preserved as far as possible before the combustion. In that process the hydrogen sulfide which is driven off is obtained in concentrated form. But stripping steam is required at a relatively high rate in that process too so that it is desirable to decrease said rate.

It is an object of the invention to avoid these and other disadvantages of the state of the art, also to further decrease the rate at which steam is required to regenerate the laden scrubbing solution, and to improve the desulfurization of the gas. It is particularly intended to replace or supplement the known processes by one which is more economical.

SUMMARY OF THE INVENTION

That object is accomplished according to the invention in that the gases to be purified are scrubbed with an aqueous potassium carbonate solution in which a content of 1.0 to 3.0 vals (gram equivalents) of alkali per mole of CO$_2$ and H$_2$S in the gases to be purified is maintained, the laden solution is subsequently regenerated by being stripped with a gas in which a CO$_2$ partial pressure above 0.2 bar is maintained, and the regenerated scrubbing solution is recycled.

The CO$_2$ partial pressure in the stripping gas is desirably controlled by the supply of a CO$_2$-containing gas.

The CO$_2$-containing gas may come from an extraneous source or may be recovered in accordance with the invention by a complete or partial desulfurization of the exhaust gas from the regeneration of the laden potassium carbonate solution.

The CO$_2$-containing gas should contain no H$_2$S or as little H$_2$S as possible.

In accordance with the invention, the exhaust gas from the regeneration of the laden potassium carbonate solution may be desulfurized by an oxidizing scrubbing treatment which is known per se and in which vanadium and anthraquinonedisulfonic acid are employed as additives or arsenic is used as an oxygen carrier.

To avoid undesired side reactions in the aqueous potassium carbonate solution used for scrubbing, care must be taken to preclude an introduction of free oxygen into the stripper with the CO$_2$-containing gas.

For this reason it will be particularly desirable within the scope of the invention in conjunction with the oxidizing scrubbing treatment to use only part of the desulfurized exhaust gas as the CO$_2$-containing gas and to use the remainder of said exhaust gas to strip the free oxygen from the oxidizing scrubbing liquor.

According to a preferred further feature of the invention, the exhaust gas from the regeneration of the laden potassium carbonate solution can be desulfurized by being scrubbed with a potassium carbonate solution at temperatures below 50° C.

This will afford the advantage that the regenerated potassium carbonate solution which becomes available in the process itself can be utilized.

Another preferred feature of the invention resides in that part of the aqueous potassium carbonate solution is circulated in a second cycle, which is separate from the first cycle, the aqueous potassium carbonate solution flowing in the second cycle is used to scrub the selectively desulfurized gas, and the gas formed by the regeneration of the laden solution is used as a CO$_2$-containing gas to strip the laden aqueous potassium carbonate solution flowing in the first cycle.

In that case, the conditions may be the same as or similar to those of the scrubbing process of the potassium carbonate solution flowing in the first cycle, i.e., the gas may be scrubbed under superatmospheric pressure and at temperatures of about 100° C.

The laden scrubbing liquor formed by the aqueous potassium carbonate solution flowing in the second cycle may be regenerated in known manner by being pressure-relieved, stripped and/or boiled.

In some cases it is desirable to add small quantities of boric acid, salts of boric acid or disodiumtetraborate (borax) to the aqueous potassium carbonate solution.

The advantages afforded by the invention reside particularly in that a very simple and highly economical process has been provided by which gases that contain $H_2S$ and $CO_2$ can be selectively desulfurized. The process distinguishes by a simple regeneration, which requires only very little energy. If the ratio of 1 to 3 vals of alkali per mole of $CO_2$ and $H_2S$ proposed according to the invention is maintained, a pure gas having a minimal sulfur content can be produced and a high selectivity can be achieved at the same time.

BRIEF DESCRIPTION OF DRAWINGS

Referring to the annexed drawings.

DESCRIPTION OF SPECIFIC EMBODIMENTS

Figure 1:
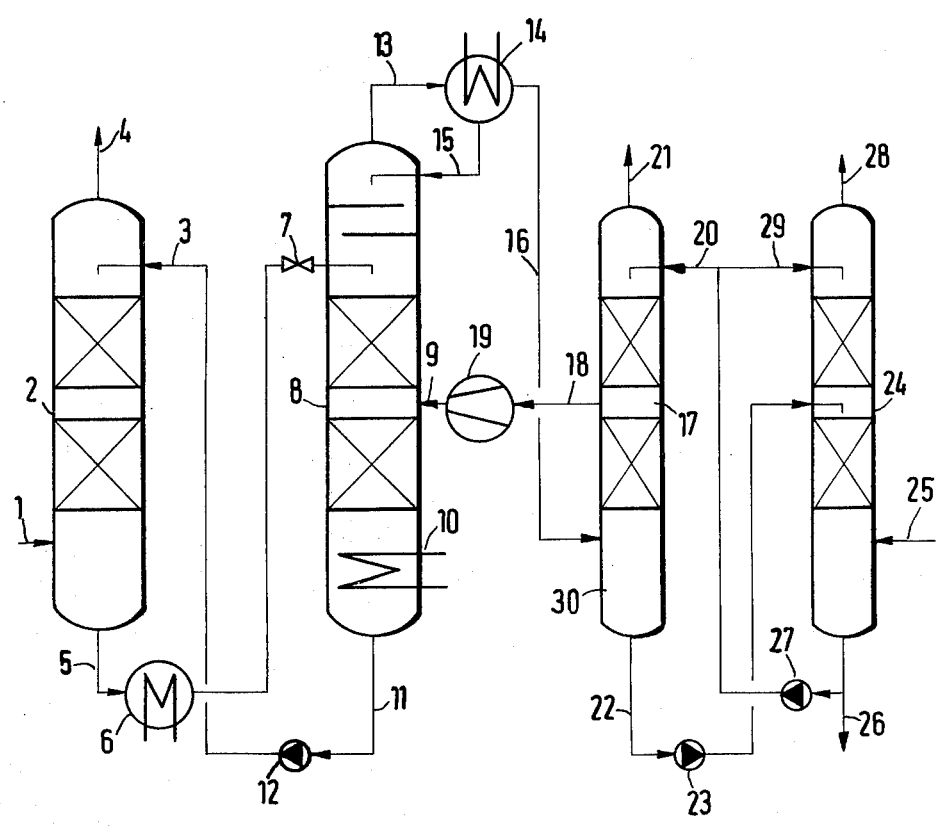
FIG. 1 is a flow diagram of a process according to the invention.

The invention is illustrated diagrammatically and by way of example in FIGS. 1 and 2 and will be described more in detail hereinafter.

The drawings show a duct 1 for supplying the $H_2S$ and $CO_2$-containing gases, a packed or plate column absorber 2, a conduit 3 for regenerated aqueous potassium carbonate solution, a duct 4 for withdrawing desulfurized gases, a conduit 5 for withdrawing laden potassium carbonate solution, a cooler 6, (FIG. 1 only) a valve 7, a stripper 8, a conduit 9 for supplying $CO_2$-containing gas, a reboiler 10, a conduit 11 for regenerated potassium carbonate solution, a pump 12, an exhaust gas duct 13, a cooler 14, a conduit 15 for condensate and a duct 16 for cooled exhaust gas. In FIG. 1 there is shown a scrubbing tower 17, a duct 18 for part of the desulfurized exhaust gas, a blower 19, a conduit 20 for oxidizing scrubbing solution, a duct 21 for sulfur-free exhaust gas, a conduit 22 for laden oxidizing scrubbing solution, a pump 23, an oxidizer 24, an air supply duct 25, a duct 26 for withdrawing separated sulfur, a pump 27, an air exhaust duct 28, a conduit 29 for part of the oxidizing scrubbing solution and a sump 30 of the scrubbing tower 17.

Figure 2:
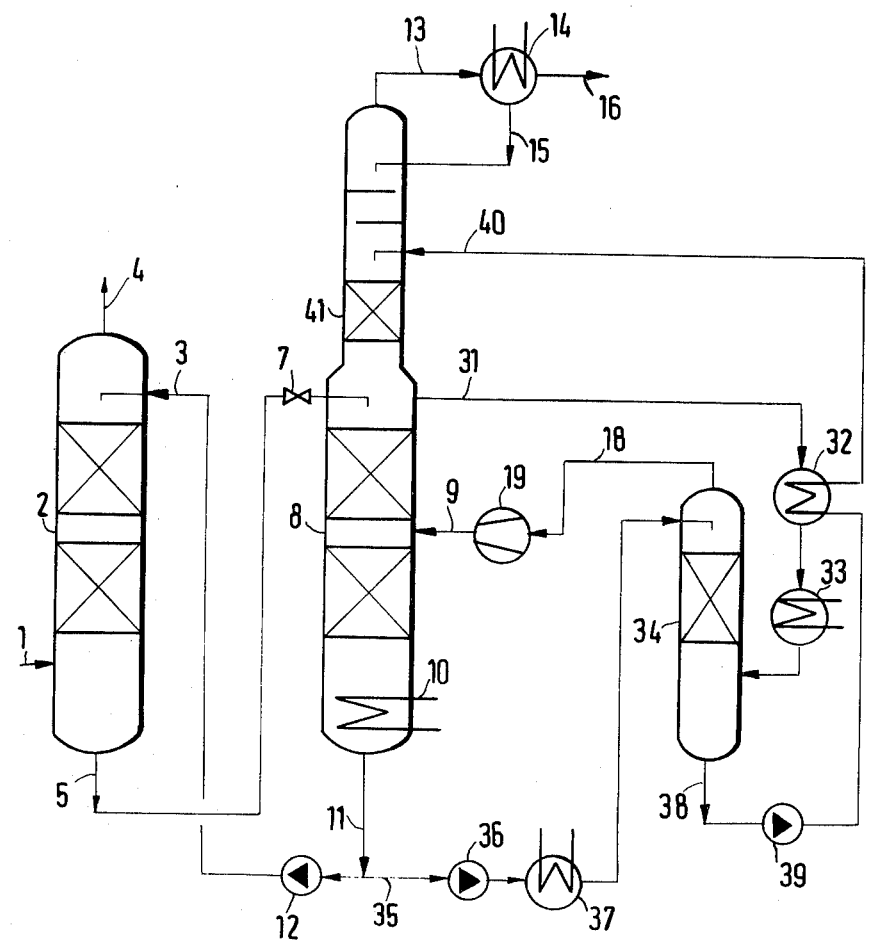
FIG. 2 is another flow diagram showing an alternative embodiment of the invention.

In the apparatus of FIG. 2, there is a duct 31 for withdrawing part of the exhaust gas from stripper 8, a heat exchanger 32, a cooler 33, a re-absorber 34. There is also a conduit 35 for part of the regenerated potassium carbonate solution, a pump 36, a cooler 37, a conduit 38 for withdrawing potassium carbonate solution from re-absorber 34, a pump 39, a conduit 40 for potassium carbonate solution and a stripping section 41 for the potassium carbonate solution which has been laden in the re-absorber.

The gases which contain hydrogen sulfide and carbon dioxide and are to be selectively desulfurized are supplied in accordance with FIG. 1 through duct 1 to the packed or plate column absorber 2 and are scrubbed therein under superatmospheric pressure and at a temperature of about 100° C. with an aqueous potassium carbonate solution. The aqueous solution is supplied to column 2 in conduit 3. During the scrubbing of the gases to be purified, a mass ratio of 1.0 to 3.0 vals of alkali per mole of $CO_2$ and $H_2S$ in the gases to be purified is maintained in the aqueous potassium carbonate solution. The desulfurized gases are withdrawn through duct 4. The laden potassium carbonate solution is withdrawn through conduit 5 and is cooled in the cooler 6 and subsequently pressure-relieved in the valve 7 and then supplied to the stripper 8, which is under a slightly superatmospheric pressure. In accordance with the invention, a $CO_2$-containing gas is supplied through duct 9 to the stripper 8 to maintain in its upper portion a $CO_2$ partial pressure above 0.2 bar. When the potassium carbonate solution has been regenerated by being pressure-relieved, stripped and boiled in the reboiler 10, it is recycled by a pump 12 to the column 2 via conduits 11 and 3. The water vapor-containing exhaust gas which becomes available as a result of the regeneration of the potassium carbonate solution is withdrawn through duct 13 and cooled in the cooler 14. The condensate is supplied in conduit 15 to the stripper 8. The cooled exhaust gas flows in duct 16 to the scrubbing tower 17 and is desulfurized in the lower part of the scrubber by being scrubbed with an oxidizing scrubbing solution. Part of the desulfurized exhaust gas is withdrawn as a $CO_2$-containing gas in duct 18 and supplied in duct 9 to the stripper 8 by the blower 19. The remainder of the desulfurized exhaust gas is used in the upper part of the scrubbing tower 17 to strip the free oxygen from the oxidizing scrubbing solution, which is supplied via conduit 20. The sulfur-free exhaust gas is withdrawn through duct 21. The oxidizing scrubbing solution laden with $H_2S$ is withdrawn in conduit 22 from the sump 30, which constitutes a residence time vessel, and is supplied by pump 23 to an oxidizer 24, in which hydrogen sulfide is converted to elementary sulfur in known manner. The air required for this purpose is supplied in duct 25. The elementary sulfur which is separated is withdrawn through duct 26. The thus regenerated oxidizing scrubbing solution is recycled through the conduit 20 to the upper part of the scrubbing tower 17 by the pump 27. In order to ensure that the exhaust air 28 is free from sulfur, said exhaust air can be scrubbed in the upper part of the oxidizer 24 with a partial stream of the oxidizing scrubbing solution. That partial stream is supplied in conduit 29.

EXAMPLE 1

A gas produced by the gasification of coal under superatmospheric pressure is to be selectively desulfurized in the plant shown in FIG. 1. That gas is saturated with water vapor and enters the column 2 through duct 1 at 105° C. and 20 bars. It has the following composition in percent by volume of dry gas:

$CO_2$:13.0
$C_nH_m$(higher unsaturated hydrocarbons):0.2
CO:15.8
$CH_4$5.0
$H_2S$:1.0
$H_2$:25.0
$N_2$:40.0

That gas is to be selectively desulfurized so that pure gas in duct 4 contains only 300 ppm $H_2S$ and as much carbon dioxide as possible. The gas is subjected to countercurrent scrubbing with an aqueous potassium carbonate solution, which is supplied at 105° C. via conduit 3. In accordance with the invention, a content of 1.52 vals of alkali per mole of $CO_2$ and $H_2S$ in the gas to be purified, which has been produced by the gasification of coal under superatmospheric pressure, is maintained in the aqueous potassium carbonate solution. For this purpose, 1590 m³ of raw gas (dry gas at 0° C. and 1.013 bars), which contains 10 kilomoles of $CO_2$ and $H_2S$, is scrubbed with 4.0 m³ of aqueous potassium carbonate solution having the following composition in kilomoles/m³:

$K_2CO_3$:0.80

$Na_2B_4O_7$:0.245
$KHCO_3$:1.683
KHS:0.027

The laden aqueous potassium carbonate solution at 110° C. is withdrawn via duct 5 from column 2 at 110° C. and is cooled to 95° C. in cooler 6 and then pressure-relieved in the valve 7. Instead of the valve 7, a turbine may be used in known manner for the pressure relief of the laden solution which has been cooled. The pressure-relieved solution is subjected in the stripper 8 to countercurrent stripping with a mixed gas-steam stream. In accordance with the invention, a $CO_2$ partial pressure above 0.2 bar is maintained in the upper part of the stripper 8. The $CO_2$ partial pressure is controlled by a supply of 5.0 kilomoles $CO_2$ via duct 9. Together with the vapors from the lower part of the stripper 8 that carbon dioxide forms a mixed gas-steam stream composed as follows:

$H_2O$:6.8 kilomoles
$CO_2$:6.7 kilomoles
$H_2S$:0.074 kilomoles

At a total pressure of 1.3 bars, the $CO_2$ partial pressure in the upper part of the stripper 8 is about 0.6 bar. As a result, only hydrogen sulfide but no carbon dioxide is stripped from the potassium carbonate solution in the upper part of the stripper. Only if the $H_2S$ is driven off in accordance with the invention in the upper part of the stripper 8 can the potassium carbonate solution be subsequently regenerated in known manner by stripping and boiling in the lower part of the stripper 8 and in the reboiler 10. The regenerated potassium carbonate solution is recycled to the column 2 through conduits 11 and 3 by the pump 12.

The exhaust gas in duct 13 contains the carbon dioxide and hydrogen sulfide which has been removed in the scrubbing column 2 as well as the carbon dioxide from duct 9 and water vapor. The exhaust gas from the regeneration of 4 m³ potassium carbonate solution contains 6.98 kilomoles $CO_2$, 0.70 kilomoles $H_2S$ as well as water vapor and small quantities of co-absorbed gases. The condensate formed when the exhaust gas is cooled in the cooler 14 is supplied in known manner in conduit 15 to the stripper 8. The $H_2S$-containing cooled exhaust gas is supplied in duct 16 to the scrubbing tower 17 and is scrubbed in the lower part of the latter with an oxidizing scrubbing solution in known manner to remove all or part of the hydrogen sulfide. Part of the desulfurized exhaust gas is withdrawn through duct 18. That partial stream contains mainly carbon dioxide and is saturated with water vapor.

That partial stream is supplied by the blower 19 through conduit 9 to the stripper 8.

The remainder of the exhaust gas is entirely desulfurized in the upper part of the scrubbing tower 17 by a treatment with all of the oxidizing scrubbing liquid and is withdrawn through duct 21. In the upper part of the scrubbing tower 17, all surplus free oxygen is thus removed from the oxidizing scrubbing liquor so that the partial stream flowing in conduits 18 and 9 is free from oxygen. An undesired formation of by-products in the potassium carbonate solution can be avoided in this way.

The oxidizing scrubbing liquid when is laden with $H_2S$ is withdrawn from the scrubbing tower 17 through conduit 22 and is regenerated in known manner and then recycled to the scrubbing tower 17 in conduit 20. The selective desulfurization by this process results in the recovery of 22.3 kg elementary sulfur, which is withdrawn through duct 26. The gas which has been produced by the gasification of coal under superatmospheric pressure and has been selectively desulfurized according to the invention leaves the desulfurizing plant through duct 4 as pure gas at about 105° C. and 19.5 bars. That gas is almost saturated with water vapor. From 1590 m³ of raw gas, 1530 m³ of pure gas (at 0° C. and 1.013 bars) are recovered, which has the following composition in percent by volume:

$CO_2$:10.63
$C_nH_m$:0.21
CO:16.41
$CH_4$:5.19
$H_2S$:0.030
$H_2$:25.98
$N_2$:41.55

97.1 percent of the $H_2S$ and only 21.3 percent of the $CO_2$ is removed form the gas produced by the gasification of coal under superatmospheric pressure. Whereas an equivalent desulfurization can be accomplished by the known process according to German Pat. No. 2,127,768, that process involves a removal of 40.4 percent of the carbon dioxide at the same time.

EXAMPLE 2

In accordance with FIG. 2, the exhaust gas from the regeneration of the potassium carbonate solution can alternatively be desulfurized by a treatment with potassium carbonate solution. This has the advantage that only one scrubbing solution is required for the selective desulfurization. In accordance with the invention the exhaust gas is scrubbed with the potassium carbonate solution at a temperature below 50° C. to produce the $CO_2$-containing gas. Regarding parts 1 to 15, the process is carried out as in Example 1, illustrated in FIG. 1, except that the cooler 6 is omitted. The cooled exhaust gas (acid gas) withdrawn through the conduit 16 contains the $H_2S$ and $CO_2$ which has been removed in column 2.

In the acid gas which becomes available as a result of the selective desulfurization according to the invention, the $H_2S$ concentration is so high that sulfur can be recovered with a sufficiently high yield in a Claus process plant.

Near the inlet through which the stripper 8 receives the pressure-relieved potassium carbonate solution, part of the exhaust gas from the regeneration of the potassium carbonate solution is withdrawn through duct 31. The exhaust gas is cooled below 50° C. in the heat exchanger 32 and cooler 33 and together with the resulting condensate is supplied to the re-absorber 34. In the latter, the exhaust gas is treated with potassium carbonate solution at a temperature below 50° C. to remove all or part of the $H_2S$. The desulfurized exhaust gas is withdrawn in duct 18 by the blower 19 and delivered by the latter in duct 9 to the stripper 8 as a gas which contains mainly $CO_2$. In this way, a partial pressure of $CO_2$ in the stripping gas above 0.2 bar is maintained in accordance with the invention in the upper part of the stripper 8, whereas the total pressure amounts to about 1.3 bars.

A partial stream of the regenerated potassium carbonate solution is taken from the conduit 11 through conduit 35 by the pump 36 and in the cooler 37 is cooled below 50° C. and is then supplied to the re-absorber 34. Laden potassium carbonate solution handled by the pump 39 is withdrawn from the re-absorber 34 through conduit 38 and is then heated in the heat exchanger 32 and supplied through conduit 40 to the stripping section 41. In the latter, the laden potassium carbonate solution is stripped with the remainder of the exhaust gas from the regeneration of the potassium carbonate solution and is then regenerated in the stripper 8 together with the pressure-relieved potassium carbonate solution. The vapors are withdrawn through duct 13 and cooled in the cooler 14. The resulting condensate is separated in known manner and is supplied through conduit 15 to the top of the stripping section 41. The acid gas is withdrawn in duct 16 for further processing. A selective desulfurization effected by this process according to the invention will subsequently be presented with reference to a numerical example, in which the recovered exhaust gas (acid gas) has such a high $H_2S$ concentration that one can recover sulfur from the exhaust gas in a sufficiently high yield in a Claus process plant.

In a plant as shown in FIG. 2, a raw gas which has been produced by the gasification of residual oil and has the following composition in percent by volume:

CO:46.1
$CO_2$:5.0
COS:0.03
$H_2$:46.1
$H_2S$:1.15
$CH_n + N_2 + Ar$:1.62 is to be selectively desulfurized to a residual $H_2S$ content of 0.02 percent by volume. 1000 m³ of the water vapor-saturated raw gas (volume of dry gas at 0° C. and 1.013 bars) are supplied at 109° C. and 21 bars through duct 1 into column 2 and are scrubbed in the latter with 1.5 m³ of aqueous potassium carbonate solution, which is supplied at 110° C. through conduit 3. In accordance with the invention, a mass ratio of 2.06 vals of alkali in the aqueous potassium carbonate solution per mole of $CO_2$ and $H_2S$ in the gases to be purified is maintained. The aqueous potassium carbonate solution has the following composition in kilomole per cubic meter:

$K_2CO_3$:1.10
$Na_2B_4O_7$:0.25
$KHCO_3$:1.08
KHS:0.02.

The laden aqueous potassium carbonate solution leaves the column 2 at 117° C. through conduit 5 and is pressure-relieved in valve 7 and then supplied to the stripper 8. The pressure-relieved solution and the solution draining from the stripping section 41 are united in stripper 8 and are stripped therein with a mixed gas-steam stream. In the upper part of the stripper 8, a $CO_2$ partial pressure above 0.2 bar is maintained in accordance with the invention whereas the total pressure amounts to about 1.3 bars. The $CO_2$ partial pressure is controlled by a supply of 5.0 kilomoles $CO_2$ via duct 9. Together with the vapors from the lower part of the stripper 8 that carbon dioxide forms a mixed gas-steam stream in kilomoles composed as follows:

$H_2O$:20.66
$CO_2$:6.17
$H_2S$:0.11

The $CO_2$ partial pressure in the upper part of the stripper 8 amounts to about 0.3 bar whereas the total pressure is about 1.3 bars.

The potassium carbonate solution is regenerated in known manner by stripping and boiling in the lower part of the stripper 8 and in the heated reboiler 10.

The regenerated potassium carbonate solution is recycled in conduits 11 and 3 to the absorber column 2 by the pump 12.

Part of the exhaust gas from the regeneration of the potassium carbonate solution is withdrawn from the top of the stripper 8 through duct 31. The remainder is supplied to the stripping section 41. The exhaust gas withdrawn through duct 31 is cooled in the heat exchanger 32 and cooler 33 and in accordance with the invention is substantially freed from $H_2S$ in the re-absorber 34 by a treatment with the potassium carbonate solution below 50° C. The exhaust gas is cooled to 32° C. and together with the resulting condensate is supplied to the re-absorber 34 and is scrubbed therein with 0.75 m³ of regenerated potassium carbonate solution. The scrubbed gas is low in $H_2S$ and consists mainly of $CO_2$ and is withdrawn through duct 18 and supplied in duct 9 to the stripper by the blower 19.

The regenerated potassium carbonate solution is withdrawn through conduit 11 and supplied to the cooler 37 by the pump 36 and is cooled in the cooler 37 to 30° C. and then supplied to the re-absorber 34. The laden potassium carbonate solution and the condensate from the exhaust gas are withdrawn through conduit 38 and supplied in conduit 40 to the stripping section 41 by the pump 39. In the stripping section 41, the potassium carbonate solution is stripped with the remainder of the exhaust gas and is heated and then united with the pressure-relieved potassium carbonate solution. The vapors from the stripping section 41 are withdrawn in known manner via duct 13 and cooled in the cooler 14. The resulting condensate is fed in conduit 15 to the top of the stripping section 41. The acid exhaust gas withdrawn through duct 16 contains 44.1 percent $H_2S$ and can be supplied to a Claus process plant for the recovery of sulfur.

The desulfurized gas contains 3.7 percent by volume of $CO_2$ and 0.02 percent of volume of $H_2S$ and is withdrawn from the absorber 2 through duct 4. It is apparent that 98.3 percent of the $H_2S$ but only 28.0 percent of the $CO_2$ contents of the raw gas have been removed by scrubbing in the absorber 2.

What is claimed is:

1. A process for selectively desulfurizing gases which contain hydrogen sulfide and carbon dioxide which comprises scrubbing said gases with an aqueous potassium carbonate solution under a superatmospheric pressure at a temperature of about 100° C., said aqueous potassium carbonate solution having a mass ratio of 1.0 to 3.0 vals (gram equivalent) of alkali in the solution per mole of $CO_2$ and $H_2S$ in the gases to be purified, regenerating the laden scrubbing solution by stripping the same with a gas in which the $CO_2$ partial pressure is above 0.2 bar and recycling the so regenerating scrubbing solution.

2. A process according to claim 1 wherein the $CO_2$ partial pressure in the stripping gas is controlled by a supply of a $CO_2$-containing gas.

3. A process according to claim 1 wherein $CO_2$-containing gas is recovered by a complete or partial desulfurization of the exhaust gas from the regeneration of the laden potassium carbonate solution.

4. A process according to claim 1 wherein the exhaust gas from the regeneration of the laden potassium carbonate solution is desulfurized by an oxidizing scrubbing treatment.

5. A process according to claim 4 wherein part of the exhaust gas which has been desulfurized by the oxidizing scrubbing treatment is used to strip free oxygen from the oxidizing scrubbing solution.

6. A process according to claim 1 wherein the exhaust gas from the regeneration of the laden potassium carbonate solution is desulfurized by being scrubbed with a potassium carbonate solution at temperatures below 50° C.

7. A process according to claim 1 wherein part of the aqueous potassium carbonate solution is circulated in a second cycle, which is separate from the first cycle, the aqueous potassium carbonate solution flowing in the second cycle is used to rescrub the selectively desulfurized gas and the gas formed by the regeneration of the laden solution is used as a $CO_2$ containing gas to strip the laden aqueous potassium carbonate solution flowing in the first cycle.

* * * * *